Jan. 15, 1963  L. STEINER  3,073,481
MACHINE FOR VENDING STAMPS AND THE LIKE ARTICLES
Filed Sept. 19, 1958  5 Sheets-Sheet 1

INVENTOR.
LOUIS STEINER
BY
J. B. Felshin
ATTORNEY.

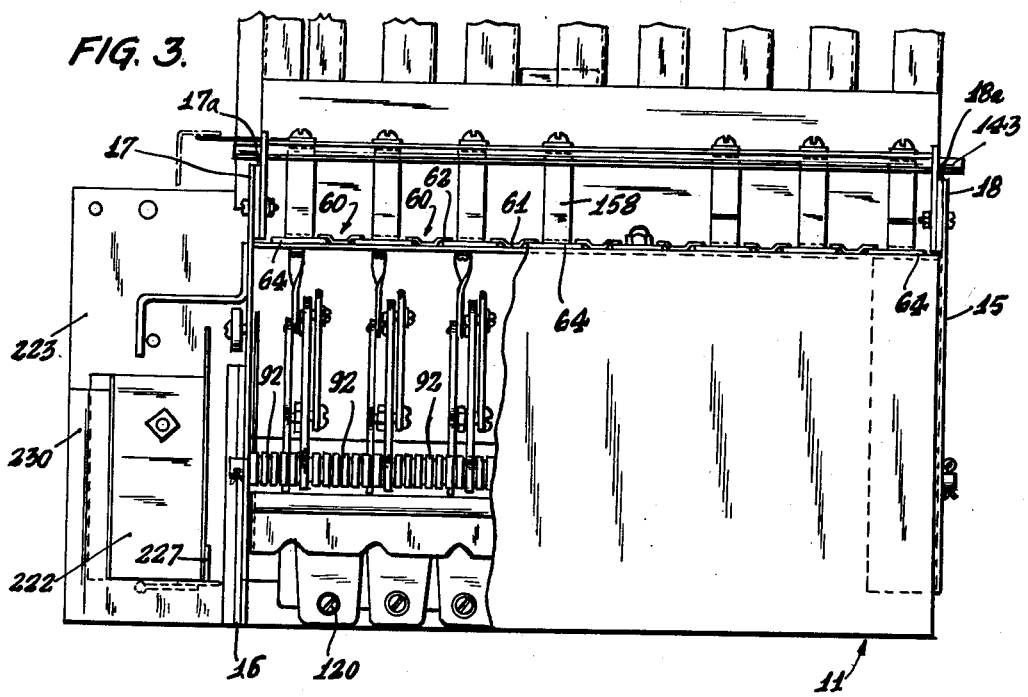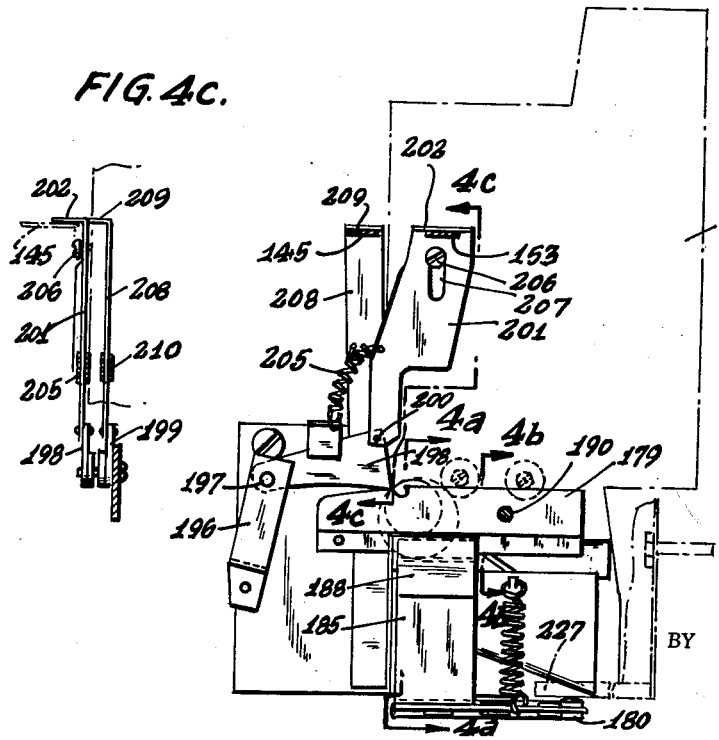

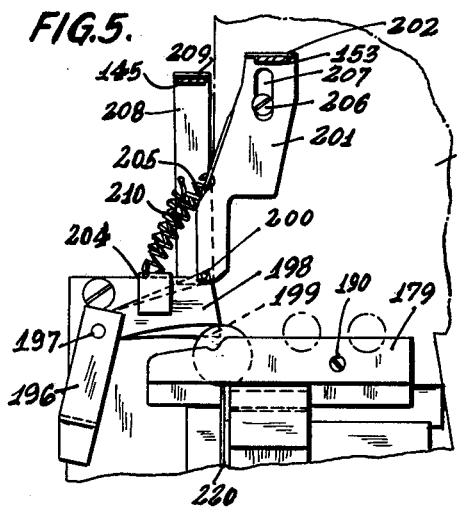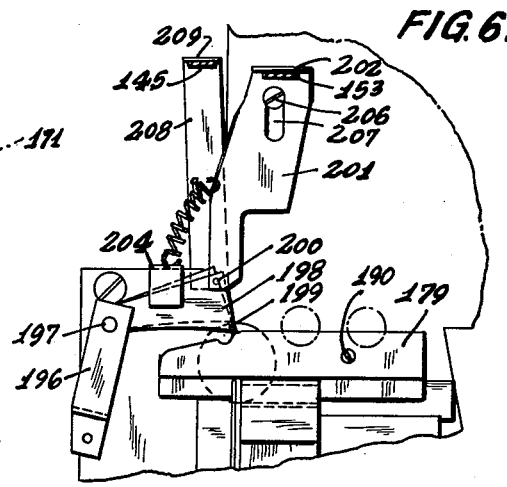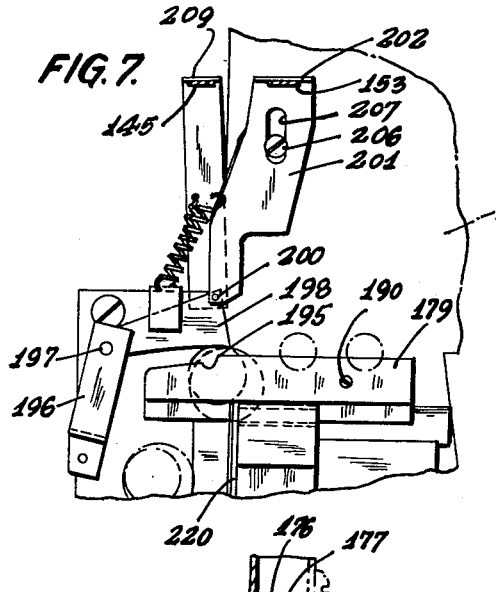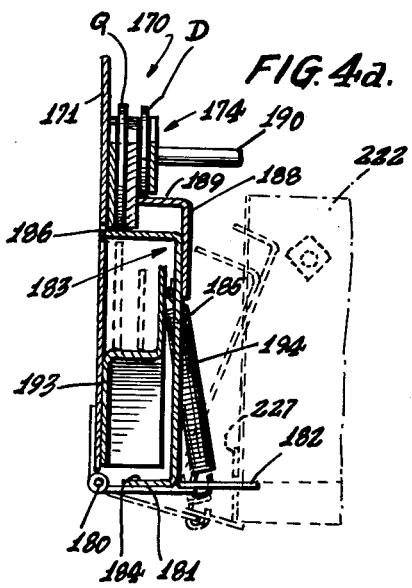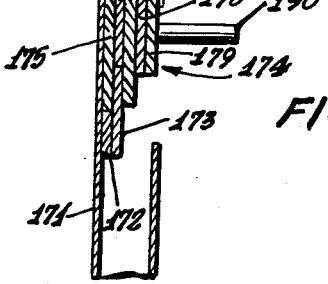

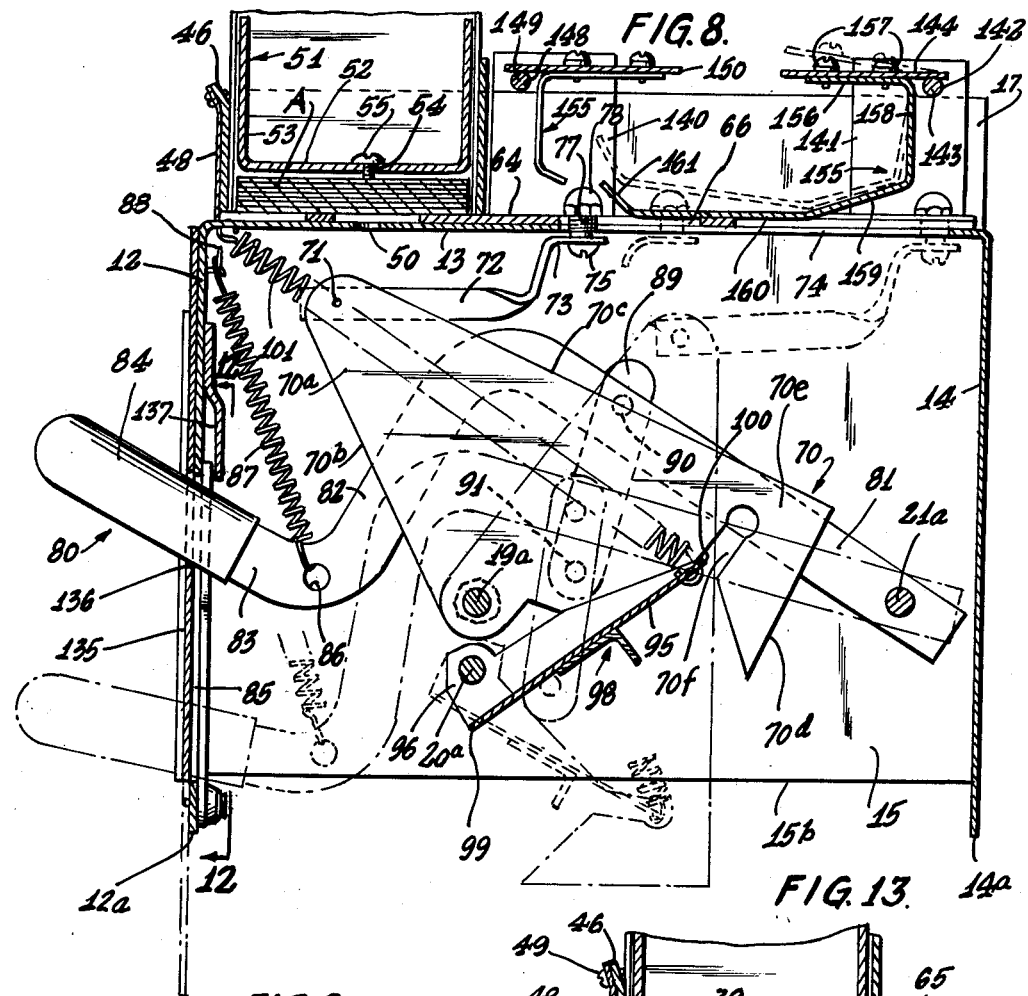
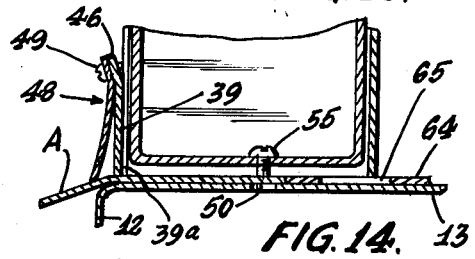
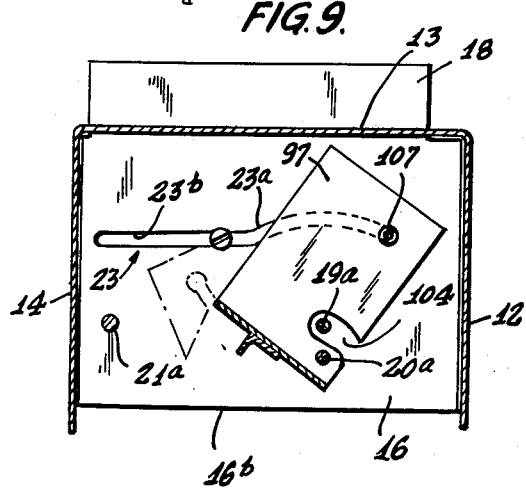

Jan. 15, 1963 L. STEINER 3,073,481
MACHINE FOR VENDING STAMPS AND THE LIKE ARTICLES
Filed Sept. 19, 1958 5 Sheets-Sheet 5

INVENTOR.
LOUIS STEINER
BY
ATTORNEY.

United States Patent Office 3,073,481
Patented Jan. 15, 1963

3,073,481
MACHINE FOR VENDING STAMPS AND
THE LIKE ARTICLES
Louis Steiner, 812 E. Park St., Long Beach, N.Y.
Filed Sept. 19, 1958, Ser. No. 762,048
12 Claims. (Cl. 221—152)

This invention relates to machines for vending stamps and the like articles. An object of this invention is to provide a machine of the character described, having a plurality of columns or chutes and means to selectively adjust the mechanism, to permit articles from any of the chutes to be dispensed either upon insertion of a dime or a quarter, or a dime and a quarter.

Another object of this invention is to provide in a machine of the character described, an operating lever for each column or chute, and a rocker controlling the coin mechanism and movable back and forth, upon actuation of any of the levers.

Still a further object of this invention is to provide in a machine of the character described, a lost motion mechanism to ensure dropping of the coins before ejection of the stamps or other articles to be vended, the construction being such that the pusher, for ejecting the merchandise from the machine, does not become active before a ratchet engages means to ensure a complete forward stroke before the backward or retraction stroke of the lever can take place.

Another object of this invention is to provide in a machine of the character described, means to prevent actuation of a lever for any column when said column is empty.

Still another object of this invention is to provide spring means at the outlet opening for each column to prevent the merchandise within the column from being pulled out without normal actuation of the operating lever.

Yet a further object of this invention is to provide a strong, rugged and durable machine of the character described, which will be relatively inexpensive to manufacture, which shall be sure and positive in operation, which shall be easy to manipulate, and yet practical and effective to a high degree and use.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the following claims.

In the accompanying drawings in which is shown various illustrative embodiments of this invention, FIG. 1 is a top plan view of a machine embodying the invention;

FIG. 3 is a partial rear elevational view thereof with part of the back wall of the casing removed;

FIG. 4 is a cross-sectional view taken along line 4—4 of FIG. 1;

FIG. 4a is a cross-sectional view taken along line 4a—4a of FIG. 4, and showing the coin return hinged support in retracted position permitting the coins to drop;

FIG. 4b is a cross-sectional view taken along line 4b—4b of FIG. 4;

FIG. 4c is a cross-sectional view taken along line 4c—4c of FIG. 4;

FIG. 5 is a partial view of the structure of FIG. 4, and showing the parts with a dime inserted, and with the dime-control latch lifted;

FIG. 6 is a view similar to FIG. 5, but showing the parts with a quarter inserted, and the quarter-latch lifted;

FIG. 7 is a view similar to FIG. 6, with both a dime and quarter inserted, and showing both the dime and quarter latches lifted;

FIG. 8 is a cross-sectional view taken along line 8—8 of FIG. 1, showing a second position of the actuating mechanism in broken lines;

FIG. 9 is a cross-sectional view taken along 9—9 of FIG. 1;

Figure 1:
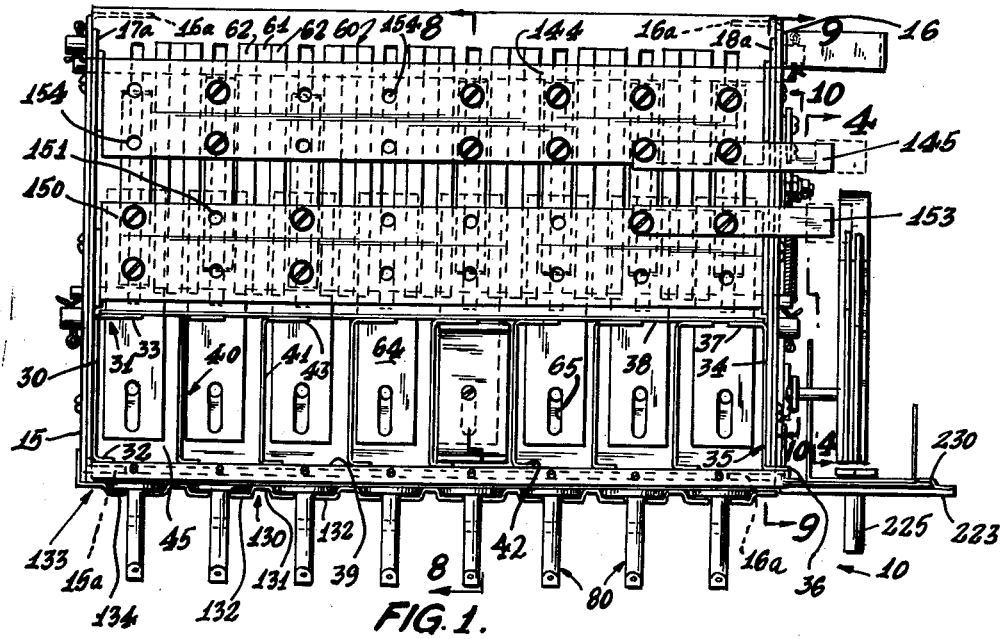

FIG. 13 is a partial vertical cross-sectional view of the lower end of a chute, with only one piece of merchandise to be dispensed therein, and showing the same partially ejected through the outlet slot at the lower end of said chute; and FIG. 14 is a view similar to FIG. 13, and showing the chute when empty, with the weight at the lower end of the chute positioned to prevent further operation of the ejecting mechanism for such chute.

Referring now in detail to the drawing, 10 designates a stamp vending or dispensing machine. The same comprises a supporting frame 11 having a front wall 12, from the upper end of which extends rearwardly a horizontal wall 13. Extending downwardly from the horizontal wall 13 is a rear vertical wall 14. The outer ends, of the front and rear walls 12 and 14, are inter-connected by vertical end walls 15 and 16. Wall 15 has inwardly extending flanges 15a, contacting the inner surfaces of the front and rear walls fixed thereto. Wall 16 has inwardly extending flanges 16a, contacting the inner surfaces of the front and rear walls attached thereto. The end walls 15 and 16 have upward extensions 17 and 18, respectively, extending above the horizontal wall 13. Said end walls 15 and 16 have lower edges 15b and 16b terminating above the lower edges 12a and 14a of the front and rear walls 12 and 14.

Walls 15 and 16 are formed with a horizontally aligned pair of openings 19, disposed about a third of the way up from the lower edges of said end walls, and somewhat closer to the front wall 12 than to the rear wall 14. Said end walls are, furthermore, formed with a pair of horizontally aligned openings 20, disposed somewhat below the openings 19. Said end walls are, furthermore, formed with a pair of aligned openings 21, substantially at the level of the openings 19, but only a little space from the rear wall 14.

Supported by the aligned openings 19 is a horizontal shaft 19a, retained against side shifting by suitable cotter pins 19b. Supported in the openings 20 is a transverse horizontal shaft 20a, retained against side shifting by cotter pins 20b. Supported in the openings 21 is a transverse horizontal shaft 21a, retained agaist side shifting by cotter pins 21b. The purpose for these three shafts will be explained hereinafter.

Wall 16 is, furthermore, formed with an elongated slot 23, having an elongated curved portion 23a which has its center of curvature at the axis of the shaft 20a. Extending from the arcuate slot portion 23a, toward rear wall 14, is a straight slot portion 23b. Fixed to the inner surfaces of the extensions 17 and 18 are reinforcing plates 17a and 18a, respectively. Attached to the inner side of plate 17a is the web 30 of a channel 31. Channel 31 has a front flange 32 and a rear flange 33. attached to the inner surface of plate 18a is the web 34 of a Z-shaped plate 35. Said plate 35 has an outwardly extending flange 36, in the plane of flange 32, and an inwardly extending flange 37, in the plane of flange 33. The channel 31 and the Z-shaped plate 35 extend vertically upwardly. The rear flanges 33 and 37 are interconnected by top and and bottom transverse plates 38. The front flanges 32 and 36 are interconnected, at the lower ends, by a transverse plate 39. Interconnecting the plates 38 and 39 are a plurality of channel members 40, each comprising a web 41, parallel to the webs 30 and 34, a front flange 42, in the plane of the flanges 32 and 36, and fixed to the plate 39, and a rear flange 43, in the plane of the flanges 33 and 37 and fixed to the plates 38. The channels 40 thus form a plurality of chutes 45 for articles A to be vended, for example, stamps within a folded piece of cardboard, or any other suitable flat-sheet article.

The front transverse plate 39 is formed with upwardly and forwardly inclined upper flange 46 (FIGS. 13 and 14). The lower edge 39a of plate 39 is spaced somewhat above the horizontal wall 13 thereby forming therewith a slot 47 for each chute. The article A when pushed forwardly from the chute, in the manner hereinafter appearing, will pass through the slot 47. It will be understood that a stack of such articles may be loaded within each chute 45. In order to prevent anyone from pulling the articles out of the chutes, through the slots 47, there is fixed to plate 39, in front of each chute, a leaf-spring 48. The leaf-springs 48 may be attached at their upper ends to the inclined flange 46, as by screws 49. The springs 48 lie against the front face of plate 39, and the lower ends of the said springs close the slots 47.

The horizontal wall 13 is formed with an opening 50, substantially centrally located with respect to each of the chutes. Slideably mounted within each chute is a weighted member 51, having a bottom wall 52 and front and rear upstanding walls 53. The bottom wall 52 is formed with a threaded opening 54, in which is screwed a screw 55 having the lower end projecting below the lower surface of wall 52. The weighted member 51 serves to press the articles A in the chute downwardly. However, when there are no more articles left in the chute, the lower end of the screw 55 will project down into the opening 50.

Attached to the horizontal wall 13 are a plurality of parallel guides 60, extending from front to rear. Each guide 60 has a central longitudinal depressed wall 61 fixed to wall 13, and a pair of outwardly extending parallel wings 62 spaced above said wall. The depressed portions 61 are in alignment with the webs 41, and the wings 62 of each member 60 are in alignment with adjacent chutes. Members 60 are located rearwardly of the chutes.

On member 13, and between each pair of guide wings 62 of adjacent members 60, is an ejector plate 64. The lower plate 38 has its lower edge spaced above wall 13, so that the ejector plate 64 will pass beneath its lower edge upon being moved, in a manner hereinafter, explained, so as to enter the chutes for ejecting the lowermost articles in said stacks. There are ejector plates 64 in the end chutes also, and these are held down by only one wing, as shown in FIG. 3 of the drawing. The ejector plates 64, normally lie partially within the chutes and partially rearwardly of the chutes, as shown in FIG. 1 of the drawings. Said ejector plates are each formed at the front end with a longitudinal slot 65. When the last article in each chute is ejected, the lower end of the screw 55 will pass through the slot 65 and enter the opening 50 to prevent the ejector plate from being moved rearwardly, in the manner hereinafter appearing, as is necessary in order to eject another article. In this manner the weight prevents further actuation of ejecting means for any empty chute. It will be understood that each ejecting plate 64 must first be moved rearwardly to permit the stack of articles in its related chute to drop, and then move forwardly to eject the lowermost article in the chute. For this purpose each plate 64 is also formed, adjacent its rear end, with a longitudinal slot 66.

Pivoted on shaft 19a, and below each chute, is a plate 70. Each plate 70 has an upwardly and forwardly inclined arm 70a, and a lower upwardly and forwardly inclined edge 70b, and an upper forwardly and upwardly inclined edge 70c. The edge 70c extends downwardly and rearwardly, and inclined downwardly and forwardly therefrom is an edge 70d, thereby forming a second arm 70e. The arm 70e extends downwardly and rearwardly. At its underside it is formed with a slot 70f, for the purpose hereinafter appearing.

Pivoted to the upper end of arm 70a, as on pivot pin 71, is a connector link 72, having a flat rearwardly extending finger 73, normally spaced below the slot 66 of the ejector plate 64. The horizontal wall 13 is formed with a longitudinal slot 74, aligned with each slot 66, but extending further rearwardly therefrom. The forward end of the slot 74 is at the forward end of the slot 66, but the rear end of the slot 74 is adjacent the rear wall 14, as shown in FIG. 8. Extending through a suitable opening of the finger 73 is a screw 75 extending upwardly through slots 74 and 66. Screwed to the shank 77 of the screw 75 is a cap nut 78 projecting above the plate 64. It will now be understood that, upon rotating plate 70 in a clockwise direction, looking at FIG. 8, in the manner hereinafter appearing, connector link 72 will be moved rearwardly sliding the screw 75 rearwardly. When said screw strikes the rear end of the slot 66, the plate 64 will be slidably moved rearwardly. There is thus a lost motion connection between the screw 75 and the plate 64. The plate 64 will be slidably moved rearwardly until it is beyond the stack of articles A, permitting this stack to drop. As the plate 70 is rotated in a counterclockwise direction, looking at FIG. 8, the forward end of ejector plate 64 will push the lowermost article through the slot 47. The purpose of the cap nut 78 on the screw 75 will be explained hereinafter.

Means is provided for rotating each plate 70. To this end there is pivoted to the shaft 21a a lever 80, there being one lever for each chute. Each lever 80 comprises an arm 81 inclined upwardly and forwardly from the shaft 21a. Extending from arm 81 is a downwardly and forwardly inclined portion 82 from which there is inclined upwardly and forwardly an arm 83, arm 83 having front thickened handle portions 84.

The front wall 12 is formed with vertical slots 85, through which the handle portions 84 pass. At the junction of the arms 82 and 83, of each operating lever 80, is an opening 86. Hooked into each opening is one end of a coil tension spring 87, the opposite end of which engages a fixed hook 88, at the inner side of the front wall 12, adjacent the upper end thereof. Each arm 81 is connected to plate 70 by a link 89. The link 89 is connected to the arm 81, as on pivot 90, and to the plate 70, as on pivot 91. Pivot 91 is located to the right of the shaft 19a so that if the lever handle 84 is pressed downwardly, the link 89 will swing the associated plate 70 in a clockwise direction. Such movement will tension the spring 87, so that when the handle is released the spring 87 will swing the lever upwardly, thereby causing rotation of the plate in a counter-clockwise direction. The position of the lever 80 and the plate 70 in the depressed position of the lever is shown in FIG. 8 of the drawings, in broken lines. Any suitable spacers 92 may be placed on the shaft 21a, and between levers 80, to retain said levers in properly spaced relation. Spacers 92 are also placed between the last levers and the end walls.

Means is provided to operate a coin-control mechanism for the machine. To this end there is mounted on the shaft 20a a transverse plate 95, having at one end a flange 96, formed with an opening through which the shaft 20a passes. The flange 96 lies against the inner surface of end wall 15. Extending from the opposite end of plate 95 is a flange 97 (see FIG. 9). Lying against the inner surface of wall 16, and likewise formed with an opening through which the shaft 20a passes, plate 95 is thus in a plane parallel to the axis of shaft 20a. Said plate may be strengthened by an angle iron 98, welded or otherwise fixed thereto. Plate 95 is normally inclined upwardly and rearwardly, as shown in FIG. 8. It has a lower edge 99, and an upper edge 100. A line, passing through the axis of shaft 20a at right angles to plate 95, is close to the edge 99 and remote from the edge 100. At the center of plate 95, adjacent the edge 100, is an opening to which is hooked one end of a coil tension spring 101 connected, at its opposite end, to the center of the front end of wall 13. The edge 100 of plate 95 contacts edges of the plate 70 at the entrance to the slot 70f. As any lever 80 is depressed, and the plate 70 associated with said lever is swung in a clockwise direction, plate 70, pressing against plate 95, will rotate said plate in a clockwise direction, looking at FIG. 8, from the full to the broken line position of such figure. During such movement, the upper portion of the plate 95 will enter the slot 70f, so that when the lever is depressed, as shown in the broken line position of FIG. 8, a portion of the plate 95 is within the slot 70f, so that said plate cannot be rotated back or in a counter-clockwise direction, unless the lever comes up, and plate 70 is again swung in a counter-clockwise direction.

Figure 10:
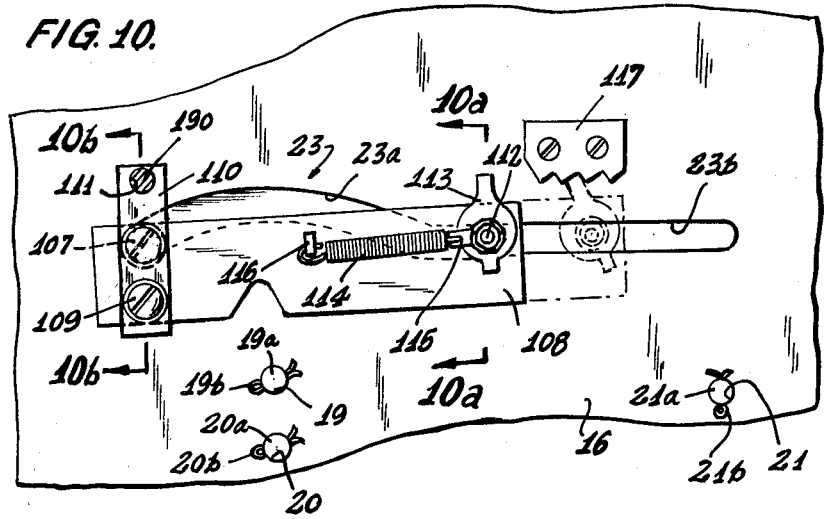
FIG. 10 is a cross-sectional view taken along line 10—10 of FIG. 1.

Flange 97 is formed with a cut-out 104 (see FIG. 9) so as to avoid striking shaft 19a. Attached to flange 97 and passing through the curved slot portion 23a of the slot 23 is a shaft 107. Attached to said shaft or screw 107, and located at the outer side of end wall 16, is a plate 108 (see FIG. 10). Mounted on plate 108 is a screw 109, to which is fixed an upwardly extending arm 110, formed at its upper end with a hole 111, for the purpose hereinafter appearing. Attached to the rear end of the plate 108 is a screw 112, on which is rotatably mounted a latch 113, normally held in upstanding or vertical position by a coil tension spring 114, attached at one end to a lug 115 on said latch, and at its other end, as at 116, to said plate. Fixed to the outer surface of end wall 16 is a ratchet plate 117. As a lever is moved downwardly, and plate 95 is swung in a clockwise direction, looking at FIG. 8, flange 97 is swung rearwardly, and during such action the shaft 107 will move through the arcuate slot portion 23a, which has its center of curvature at the axis of the shaft 20a. During such period the front shaft or screw 112 will move rearwardly in the straight slot portion 23b, of the slot 23, and the latch 113 will be rotated in a counter-clockwise direction, looking at FIG. 10, with the end of the latch skipping from one tooth to another of the ratchet. As the stroke stops, while the latch is still engaging a tooth of the ratchet, plate 95 will not swing back toward normal position, and hence, plate 70 will not swing back and the lever 80 will not come up. In other words, the lever 80 must be pulled all the way down so that the latch 113 passes beyond the ratchet 117 before the parts can move back to their normal positions.

Means is provided to prevent more than one lever being actuated at a time. To this end there is pivoted to the inner side of the front wall 12, as on pivot 120, lock-plates 121. There is one lock-plate between each adjacent pair of levers. The lock-plates 121 extend upwardly. The total looseness between all the lock-plates is greater than the thickness of one handle portion 84, but less than the thickness of two handle portions 84. Thus, when one handle is pulled down, as shown in FIG. 12, the lock-plates on opposite sides of said handle separate, thereafter another lock handle cannot be depressed while the first handle is down, because there would not be sufficient room for a second handle to be moved down.

Figure 2:
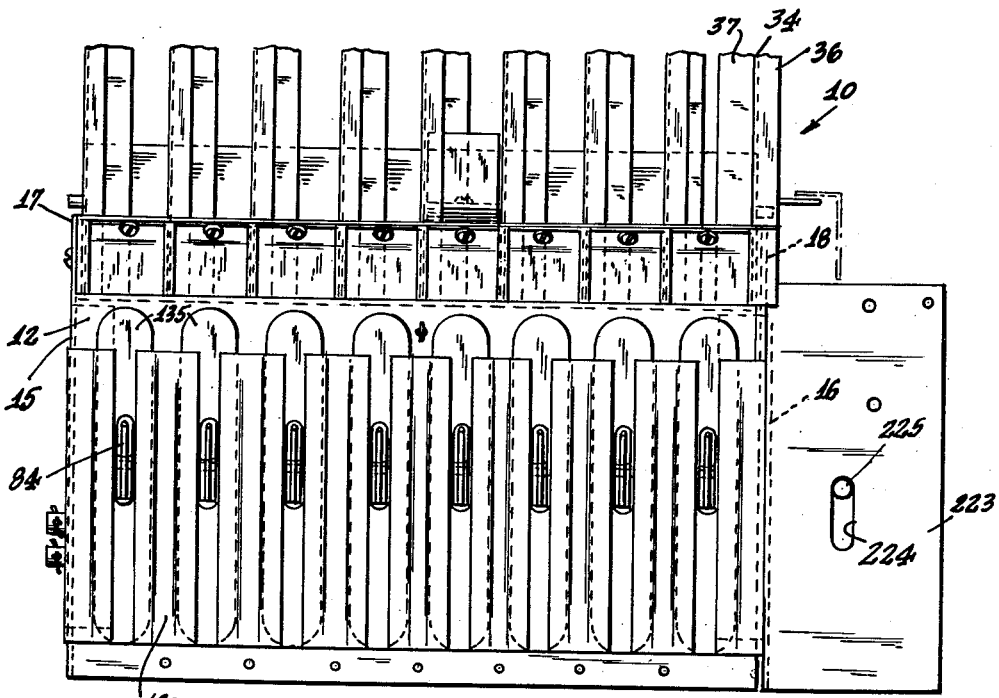
FIG. 2 is a partial front elevational view thereof.

Means is provided to close the slots 85 through which the handles 84 pass. To this end there is attached, to the front surface of the front wall 12, a plurality of vertical guide members 130. The guide members 130 are located between adjacent handles. Each guide member 130 has a central portion 131 and wings 132 (see FIGS. 1 and 2), and guide members 133, at the end handles, each have a single wing 134. Slidably mounted, between each pair of inwardly extending wings 132 and the front wall 12, is a sliding plate 135. There is sufficient space between adjacent wings 132 for the handle 84 to pass. Each plate 135 is formed with a slot 136, through which one of the handles 84 passes. It will now be observed that, as the handles are moved down or up, the slide plates 135 move up and down therewith. The plates 135 cover the slots 85 in the front wall 12. The upper end portions of the plates 135 project above the guides 130, 133, and these projecting portions may be marked with the price of the stamps in the chute with which they are associated.

Figure 12:
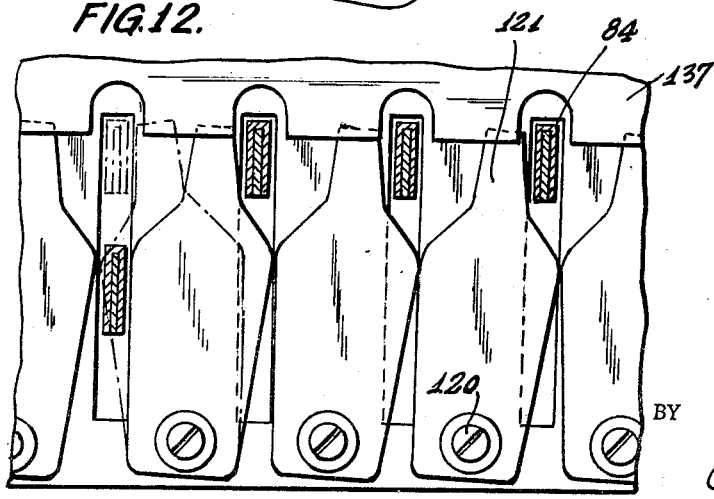
FIG. 12 is a cross-sectional view taken along line 12—12 of FIG. 8.
Figure 10B:
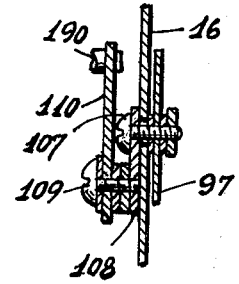
FIG. 10b is a cross-sectional view taken along line 10b—10b of FIG. 10.

An inner plate 137, fixed at its upper end to the inner surface of front wall 12, has a downwardly skirted portion overlapping the upper ends of the lock-plates 121 (see FIGS. 8 and 12). Fixed to the inner surfaces of the upward extensions 17 and 18, of the end walls 15 and 16, respectively, are spaced pairs of vertical opposed plates 140 and 141. Plates 140 are closer to the chutes, and the plates 141 are closer to the rear of the machine.

The rear plates 141 are formed, adjacent the upper rear corners thereof, with aligned pair of openings 142, located above the upper edges of the extensions 17 and 18. Received within said openings are outwardly extending pintles 143, fixed to the undersides of the ends of a horizontal transverse plate 144. The plate 144 extends forwardly from the pintles. Attached to the right end of plate 144 is a metal strip 145, overlying the upper edge of the extension 18 of end wall 16. The plates 140 are formed, adjacent their upper front corners, with aligned pair of openings 148, located above the upper edges of the extensions 17 and 18, and at the level of the pair of openings 142. Rotatively received within the openings 148 are a pair of pintles 149, extending outwardly from and fixed to the undersides of the ends of a transverse horizontal plate 150. The plate 150 extends rearwardly from the pintles 149, and is normally at the level of the plate 144. Fixed to the plate 150, at the right end thereof and extending therebeyond, is a strip 153 disposed in the plane of strip 145 and parallel thereto, as shown in FIG. 1 in the drawing. The purpose of the strips 145 and 153 will be explained hereinafter.

The plates 144 and 150 are each formed with a pair of openings 151, 154, respectively, in alignment with each chute, as shown in FIG. 1. There may be attached to the pair of openings 154, in the plate 144, a lever or adaptor 155 (see FIG. 8). The lever 155 comprises an arm 156, contacting the underside of plate 144, in transverse relation thereto and below the pair of openings 154. Arm 156 may be provided with screw-threaded openings to receive screws 157, passing through the openings 154, and screwed to said arm. Extending downwardly from arm 156 is a vertical portion 158, from which extends a downwardly and forwardly inclined portion 159. Extending from the portion 159 is a horizontal portion 160, from which extends an upwardly and forwardly inclined lip 161. The lip 161 is in the path of one of the cap nuts 78, so that as the lever for the associated chute is depressed, and the cap nut 78 moves rearwardly, it will engage the lip 161 and cause the lever 155, and hence the plate 144, to be swung upwardly, from the full-line position to the broken-line position shown in FIG. 8. The lever 155 may be attached in the position, shown in FIG. 8, to any pair of openings 154, in order to lift the strip 145 upon depression of the lever 80 associated therewith.

It will be observed that a similar lever 155 may be attached in reversed position to any pair of openings 151 of the plate 150, as shown partially in FIG. 8 of the drawings. It will now be observed that when any lever 80 is depressed, the cap nut 78 associated therewith, will engage lever 155 attached to plate 150, if there is such a lever attached to the plate in alignment with the chute associated with said lever. If there is a lever attached to plate 144, then the cap nut 78 will engage such lever, and if for any chute there are no levers attached then neither of the plates 144 nor 150 will be swung, and neither of the strips 145 and 153 wil be raised. It is manifest therefore that the machine may be adapted for raising either the strip 145 or the strip 153, or neither, for any selected chute, upon operation of the lever 80 for such chute. The function of the strips 145, 153 will be explained hereinafter.

Associated with the machine is a coin-control mechanism 170. Said coin-control mechanism comprises a vertical plate 171 fixed to the machine, in parallel spaced relation to the end wall 16. Fixed to plate 171 is a horizontal strip 172, to which is fixed a bar 173, also horizontal, but extending upwardly above the upper edge of strip 172. Slidably mounted on members 172, 173, is a coin-receiving slider or carriage 174. The carriage 174 comprises a horizontal bar 175, lying against the inner surface of plate 171. The lower end of the bar 175 is slidably received between plate 171 and bar 173. Attached to the inner surface of bar 175 are spaced bars 176, riding on the upper edge of bar 173 and spaced apart to form a slot through which a quarter may pass. Attached to bars 176 is a bar 177, contacting the inner surface of bar 173. Attached to the inner surface of bar 177 are spaced bars 178 forming, therebetween, a slot to receive a dime. Attached to the spaced bars 178 is a bar 179. The upper edges of the bars 175 to 179 are all in the same horizontal plane, as shown in FIG. 4b of the drawings. In FIG. 4a, the quarter is indicated by Q and the dime is indicated by D. Any suitable coin-receiving means may be provided to return the coins to the quarter and dime slots, and any suitable bad coin detectors or scavengers may be provided (not shown).

Figure 11:
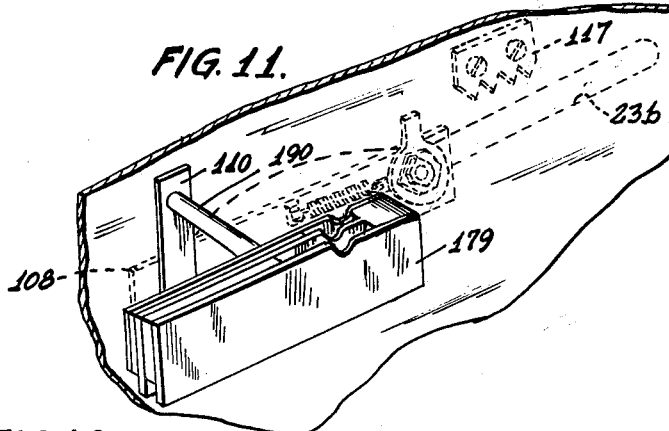
FIG. 11 is a perspective view of the coin-control slider, and showing the mechanism to insure a full stroke, in dotted lines.
Figure 10A:
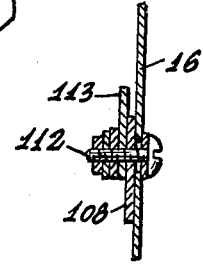
FIG. 10a is a cross-sectional view taken along line 10a—10a of FIG. 10.

Means is provided to support the quarter and dimes dropped into the quarter and dime receiving slots in the slider 174. To this end there is pivoted to the lower end of the plate 171, as at 180 (see FIG. 4a), a horizontal plate 181, Welded to one end of the plate 181 is an outwardly extending finger 182, for the purpose hereinafter explained. Also welded to the plate 181 is a channel member 183, comprising a bottom flange 184, fixed to said plate, and a vertical web 185, from which extends a finger or flange 186 disposed beyond bar 173 underlying the coin slot for the quarter. Fixed to the web 185 is an angle-shaped member 188 and a finger 189, located beneath the dime slot, the same being at a higher level than the finger 186. Fixed to the bar 179 of the slider 174 is a horizontal pin 190. The end of shaft 190 is received in hole 111 in the extended end of link 110 (FIGS. 10 and 11) thereby operatively connecting slider 174 to plate 108.

It will be noted that when the finger 182 is depressed, members 183, 188, will be swung from the position shown in full lines in FIG. 4a to the broken-line position thereof, allowing the coins to drop down to a coin-return means of a chute 193 for that purpose. Plate 181 is connected to a fixed portion of the chute 193, by a coil tension spring 194, so that when finger 182 is released and the coins have dropped, the coin-supporting means will move back to operative position (shown in full lines in FIG. 4a).

Bars 177 and 179 are each formed, adjacent their forward ends, with a shoulder stop 195. Attached to plate 171 is a bracket 196, supporting a horizontal shaft 197. Pivoted to shaft 197 are a pair of similar levers 198 and 199. Pivoted to the front end of the lever 198, as at 200, is a member 201 having, at the upper end thereof, an offset horizontal finger 202. Member 201 is connected to a fixed bracket 204, by coil tension spring 205, which tends to pull the member 201 downwardly, as it is pushed up and then released. Fixed to plate 171 is a headed screw 206 passing through a slot 207 in member 201. Pivoted to the lever 199 is a member 208 having at its upper end an offset finger 209 and, likewise, connected by a spring 210 to the fixed bracket 204. Any suitable means may be provided for guiding the arm upward and downward.

If any coin or coins are inserted into the machine, they will drop into the respective quarter and dime slots. If the proper coins are inserted and the handle is then depressed, the slider 174 will be moved rearwardly, and the coins will raise the levers 198 and 199 lifting the levers above the stop shoulder 195, allowing the slider to move further rearwardly. During the first part of the rearward movement, the screw 75 will move through the slot 66 without affecting the ejection slider 64. However, if there are coins in the slots, and both levers are raised, the ejection slider 64 will be pushed rearwardly sufficiently for the lowermost article in the chute to drop down in front of the front edge of the ejection slider and on top of the wall 13. When the lever is released and moves up, the slider 64 is then moved forwardly, to eject such article. If there are not two coins in the slots, one or the other, or both, of the levers 198, 199, will engage one or the other, or both, of the stop shoulders 195, to prevent further movement of the ejection slider 64 rearwardly.

Two coins—that is, a quarter and a dime—must be inserted for any chute where there are no levers 155 attached to the plates 144, 150. However, if for any chute a lever 155 is attached to the plate 144, then strip 145 will move upwardly and engage the offset finger 209. It will thus be seen, that the outer end of thre strip 145 is located just below the offset finger 209, and thus the attachment of a lever 155 to a plate 144 for any chute, is equivalent to insertion of a quarter. Thus, if for any reason, there is a lever 155 attached to plate 144, the insertion of a dime will permit operation of the machine for that chute. That will be a ten cent chute. The strip 153 underlies the offset finger 202 and hence if a lever 155 is attached for any chute to the plate 150, the operation of that chute will lift the lever 198, due to the engagement of the strip 153 with the said offset finger 202 taking the place of an insertion of a dime. If for any chute there are no levers attached either to the plate 144 or 150, then it will require the insertion of both a dime and a quarter to operate the operating lever 80 for such chute. Thus, any of the chutes can be quickly converted into a ten-cent chute, a quarter chute, or a thirty-five cent chute.

If the slider 174 is moved all the way rearwardly, the coins will move rearwardly, beyond the fingers 189 and 186 and beyond a fixed partition 220 (see FIG. 7), and will drop down to a suitable coin box. The coin-return may be operated by means of a member 222 mounted for vertical sliding movement on an extension wall 223, fixed to the end wall 16 and disposed in the plane of the wall 12. Extension wall 223 is formed with a vertical slot 224, and fixed to member 222 is a pin 225 projecting forwardly through said slot to be operated manually by the operator. Fixed to member 222 is a finger 227, overlying the finger 182. Should the operator desire to get his coins back before operation of the machine, pin 225 may be pushed downwardly causing finger 227 to press downwardly on finger 182 for retracting the coin-return mechanism 133 as illustrated in FIG. 4a, to permit the coins to be returned. The spring 194 pulling up on plate 181 will also raise member 222. Any suitable guide means 230, fixed to the front plate 223, for engaging the ends of plate 222, may serve to retain said member 222 in position for up and down movement.

It will thus be seen that there is provided an apparatus in which the several objects of this invention are achieved and which is well adapted to meet the condition of practical use.

As possible embodiments might be made of the above invention, and as various changes might be made in the embodiment above set forth, it is to be understood that all matter herein set forth or shown in the accompanying drawings is to be interpreted as illustrative and not in a limiting sense.

I claim:

1. A dispensing machine comprising a support having a horizontal wall and a front wall extending down therefrom, a chute mounted on the horizontal wall, extending upwardly therefrom and adapted to contain a stack of articles to be dispensed one at a time, a front wall at the front of the chute and the horizontal wall forming a slot at its lower end through which the lowermost article in the chute may be ejected, an ejector slidably mounted on said horizontal wall, in the plane of said slot, and having its front end normally projecting forwardly into said chute, so that the stack of articles in the chute rests on said ejector and above said slot, manual controlled means for retracting the ejector to permit the articles in the chute to drop onto said horizontal wall and to move the ejector forwardly to move the lowermost article in the chute through said slot, a spring attached at its upper end to the front wall of the chute and the lower free end of the spring overlying and covering said slot, whereby said spring is flexed when an article is ejected through said slot, said manually controlled means comprising an operating lever pivoted within the support about a horizontal axis and having a handle portion projecting through a vertical slot in the front wall of the support, a first member pivoted within the support about a horizontal axis parallel to the first mentioned axis, a link connecting said lever with said pivoted first member, a link connecting said member with said ejector, spring means connecting said lever to said support, a second member, spring means connecting said second member to said support, said first member being formed with a slot adapted to rotate said second member, and releasable means on said second member to prevent rotation of said first member.

2. The combination of claim 1, the pivotal point of said lever to said support being disposed rearwardly of the pivotal connection of said pivoted member to said support, said link being connected to said lever forwardly of the pivotal connection of the lever to the support, and said link being connected to said pivoted member rearwardly of the pivotal connection of said pivoted member to said support, whereby depression of the handle will cause rearward retraction of said ejector, and said spring which connected the lever to the support being arranged to raise the lever after said lever has been depressed and released.

3. A dispensing machine comprising a support having a horizontal wall and a front wall extending downwardly therefrom, a chute mounted on said horizontal wall and extending upwardly therefrom and adapted to contain a stack of articles to be dispensed, an ejector slidably mounted on said horizontal wall, an operating lever pivoted within said support and below said horizontal wall about a horizontal axis and having a handle portion projecting through a vertical slot in the front wall of said support, a first member pivoted within said support about a horizontal axis, a link connecting said lever with said first member, means to connect said first member to said ejector, a second member pivoted to said support about a horizontal axis, said first member being formed with a slot and means on the first member to rotate said second member upon depressing said lever, and said second member being adapted to enter into the slot in said first member when rotated by the first member upon depressing said lever, and releasable means to prevent rotation of said second member.

4. The combination of claim 3, in combination with spring means biasing said second member, to rotate in a direction opposite to which said second member is rotated by rotation of said first member.

5. The combination of claim 3, in combination with a straight flat plate slidable up and down on the front wall and formed with an opening, said handle projecting through said opening, and said straight plate being movable up and down by said handle to retain the slot in the front wall covered in all positions of said handle.

6. In combination, a support having a horizontal wall, a chute on said horizontal wall and extending upwardly therefrom, an ejector on said horizontal wall and formed with a longitudinal slot, a manual operating means on said support, a pair of movable members on said support, an adaptor selectively detachably attached to either one or the other of said pair of members, actuator means connected to said manual means and passing through said slot, for engaging said adaptor, to move the member of said pair of members to which said adaptor is attached, said horizontal wall having a longitudinal slot aligned with the slot in the ejector but longer than said ejector slot, and said actuator means passing through the slot in said horizontal wall, as well as through the slot in the ejector, and having a limited movement independent of said ejector.

7. In combination, a support having a horizontal wall formed with a slot, an ejector slidably mounted on said wall and having a slot overlying the first slot, an actuator passing through said slots, manual controlled means to move said actuator, said manual controlled means including a member pivoted to said support and formed with a slot, a rocket pivoted to said support, said member having means for moving the rocker into said slot in said member, a slider, releasable means to prevent movement of the slider, means connecting said rocker to the slider, a member movably mounted on the support and provided with means to release said releasable means, an adaptor detachably attached to said movably mounted member, and means on said actuator to move said adaptor for moving said movably mounted member for releasing said releasable means.

8. A machine comprising a support, an ejector slidably mounted on said support, means for moving the ejector including a member pivoted to said support and formed with a slot, a rocker pivoted to the support, means on said member to move said rocker into said slot, a slider, means to connect said rocker to said slider, and releasable means to prevent movement of said slider.

9. The combination of claim 8, in combination with a member movably mounted on said support, an adapter detachably attached to said movably mounted member, and the means for moving said ejector including means for engaging said adapter for raising said movably mounted member, and means on the movably mounted member for releasing said releasable means.

10. A combination of claim 9, the means for moving the ejector including a lost motion connection between said means and said ejector.

11. In combination, a support having a wall, an ejector slidably mounted on said wall, an actuator connected to said ejector for moving said ejector, a first member movably mounted on said support, means to connect said first member to said actuator for moving the actuator upon moving said first member, a rocker movably mounted on said support, said first member having means for moving the rocker away from normal position upon moving said first member away from normal position, said first member having means to prevent movement of the rocker back to normal position unless said first member is moved back to normal position, a slider, releasable means to prevent movement of said slider, means connecting said rocker to said slider, a second member movably mounted on said support and provided with means to release said releasable means, an adaptor detachably attached to said second movably mounted member, means on said actuator to move said adaptor for moving said second movably mounted member for releasing said releasable means, manually controlled means for moving said first member, a chute on said wall, and said ejector being adapted to project into said chute.

12. The combination of claim 11, said connection between the actuator and the ejector comprising a lost motion connection.

References Cited in the file of this patent

UNITED STATES PATENTS

| | | |
|---|---|---|
| 461,610 | Herold | Oct. 20, 1891 |
| 730,624 | Elliott | June 9, 1903 |
| 731,785 | Kennedy | June 23, 1903 |
| 766,728 | Pumphrey | Aug. 2, 1904 |
| 1,056,960 | West | Mar. 25, 1913 |
| 1,075,132 | Westensee | Oct. 7, 1913 |
| 1,600,623 | Chesnut | Sept. 21, 1926 |
| 1,612,040 | Molloy | Dec. 28, 1926 |
| 1,753,090 | Nixon | Apr. 1, 1930 |
| 1,776,462 | Bernart | Sept. 23, 1930 |
| 1,879,884 | Rowe | Sept. 27, 1932 |
| 1,951,746 | Bonaccolta | Mar. 20, 1934 |
| 2,036,921 | Christmas | Apr. 7, 1936 |
| 2,085,153 | Gorretta | June 29, 1937 |
| 2,128,180 | Du Grenier | Aug. 23, 1938 |
| 2,191,585 | Pulver | Feb. 27, 1940 |
| 2,207,902 | Steiner | July 16, 1940 |
| 2,373,014 | Compton | Apr. 3, 1945 |
| 2,400,104 | Compton | May 14, 1946 |
| 2,429,148 | Wilder | Oct. 14, 1947 |
| 2,681,842 | Rabkin | June 22, 1954 |
| 2,823,782 | Ridings | Feb. 18, 1958 |
| 2,859,849 | Neidig | Nov. 11, 1958 |

FOREIGN PATENTS

| | | |
|---|---|---|
| 450,755 | Germany | Oct. 14, 1927 |
| 625,076 | Germany | Feb. 3, 1936 |